US012576961B2

(12) United States Patent
Custance

(10) Patent No.: US 12,576,961 B2
(45) Date of Patent: Mar. 17, 2026

(54) AIRCRAFT CONTROL SURFACE SYSTEM

(71) Applicant: Airbus Operations Limited, Bristol (GB)

(72) Inventor: Denys Custance, Bristol (GB)

(73) Assignee: Airbus Operations Limited, Filton (GB)

( * ) Notice: Subject to any disclaimer, the term of this patent is extended or adjusted under 35 U.S.C. 154(b) by 24 days.

(21) Appl. No.: 18/514,422

(22) Filed: Nov. 20, 2023

(65) Prior Publication Data

US 2024/0174349 A1 May 30, 2024

(30) Foreign Application Priority Data

Nov. 25, 2022 (GB) ...................................... 2217697

(51) Int. Cl.
*B64C 9/32* (2006.01)
(52) U.S. Cl.
CPC ................ *B64C 9/323* (2013.01); *B64C 9/32* (2013.01)
(58) Field of Classification Search
CPC .. B64C 9/32; B64C 9/323; B64C 9/34; B64C 5/10; B64C 5/18
See application file for complete search history.

(56) References Cited

U.S. PATENT DOCUMENTS

| | | |
|---|---|---|
| 2,164,531 A | 7/1939 | Lee |
| 2,402,118 A | 6/1946 | Ashkenas |

| | | | |
|---|---|---|---|
| 11,673,652 B2 | 6/2023 | Cosentino | |
| 2015/0284955 A1 | 10/2015 | Adams | |
| 2015/0368903 A1 | 12/2015 | Turse | |
| 2020/0262540 A1* | 8/2020 | Mackin | ................... B64C 9/323 |

FOREIGN PATENT DOCUMENTS

| | | | |
|---|---|---|---|
| CN | 111204446 A | 5/2020 | |
| DE | 102015014262 A1 * | 5/2017 | ............. B64U 30/12 |
| FR | 877346 A | 12/1942 | |
| WO | 2022024112 A1 | 2/2022 | |

OTHER PUBLICATIONS

Extended European Search Report for Application No. 23210641.9 dated Mar. 28, 2024, 10 pages.
British Search Report for Application No. 2217697 dated Sep. 25, 2023.
European Intention to Grant EP Application No. 23210641.9 dated Sep. 30, 2025, 39 pages.

* cited by examiner

*Primary Examiner* — Nicholas McFall
*Assistant Examiner* — Justin Michael Heston
(74) *Attorney, Agent, or Firm* — KDW Firm PLLC

(57) ABSTRACT

An aircraft control surface system for an aircraft structure, that can be a pop-up spoiler for an aircraft wing, includes a deployable control surface member and a deployment mechanism. The deployment mechanism moves the deployable control surface member between a retracted position and a deployed position. In the retracted position, the deployable control surface member is curled to facilitate stowage within the aircraft structure. In the deployed position, the deployable control surface member is uncurled and extends from a surface of the aircraft structure. The deployment mechanism enables the deployable control surface member to extend to have a straight portion with a length greater than the local depth of the aircraft structure.

17 Claims, 7 Drawing Sheets

<u>Fig. 1</u>

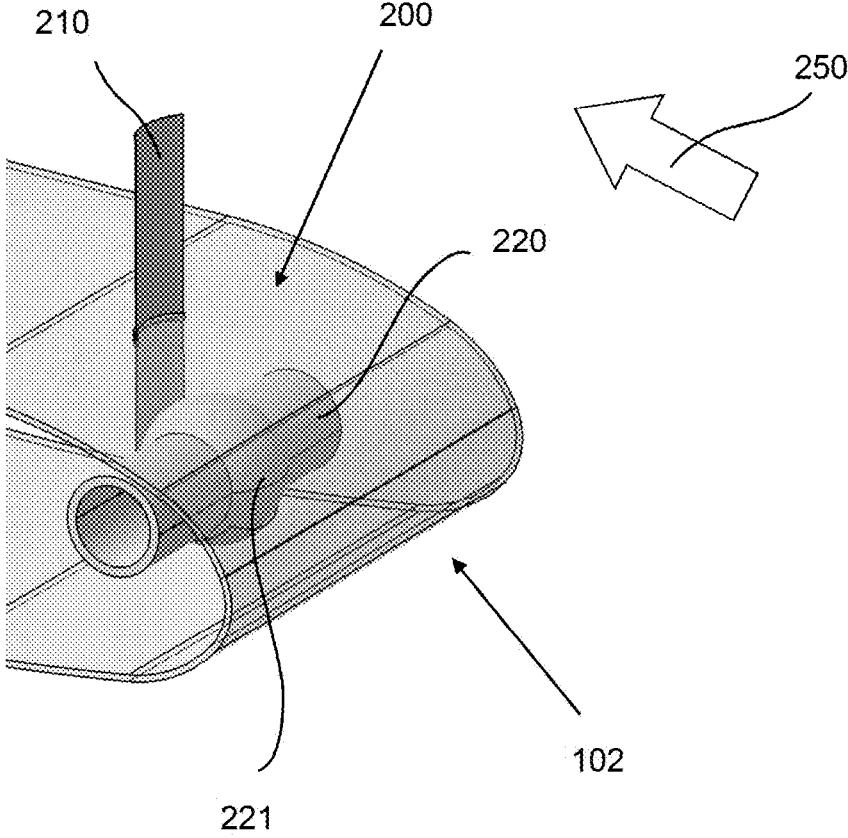
<u>Fig. 3</u>

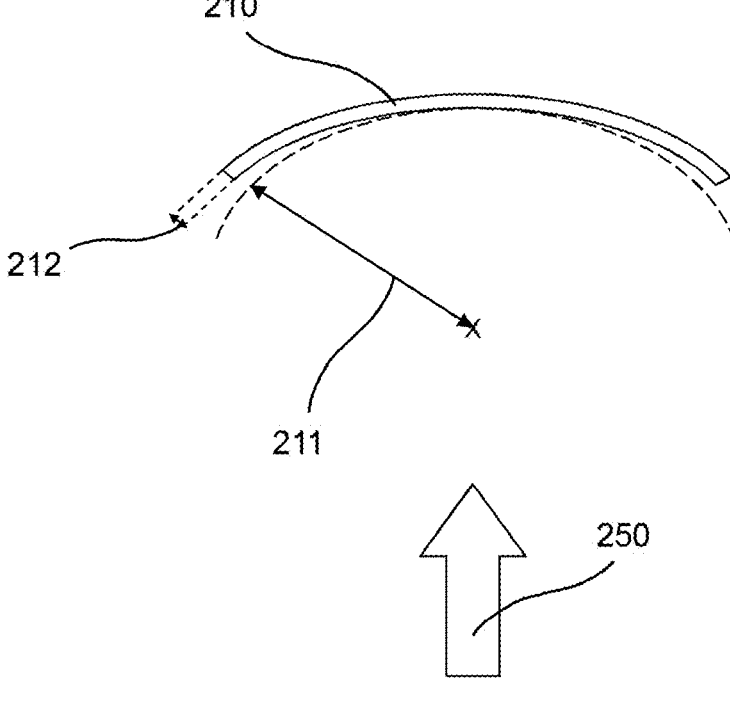
<u>Fig. 5</u>

300

400

AIRCRAFT CONTROL SURFACE SYSTEM

TECHNICAL FIELD

The present disclosure relates to control surfaces on an aircraft.

BACKGROUND

The disclosure herein concerns an aircraft control system for an aircraft structure. More particularly, but not exclusively, this disclosure herein concerns an aircraft control surface system for an aircraft structure, a pop-up spoiler for an aircraft wing, an aircraft structure (for example a wing) and a method of moving a deployable control surface member between a retracted position and a deployed position.

An aircraft spoiler is an example of an aircraft control surface. Spoilers may be arranged such that they are deployed upwardly from an aircraft wing in order to spoil the airflow over the wing, and therefore reduce lift. Such spoilers are commonly positioned on the outboard leading edge of the wing. There may be several spoilers arranged across the span of the wing.

A spoiler may be arranged to raise and lower as a hinged plate, such that when stowed the upper surface of the spoiler forms a part of the upper surface of the wing presented to the airflow. In an alternative configuration, the spoiler may be arranged to be stowed within the wing and be vertically deployed when required, and during deployment move through a slot in the upper surface of the wing, so that the spoiler then extends beyond the upper surface of the wing.

A spoiler may be arranged to deploy in response to a demand signal received from the pilot or an aircraft control system, for example for the purpose of reducing lift or for load alleviation in the event of gusts.

Spoilers are commonly used on gliders, but the structural requirements are very different when compared to the use of spoilers on a modern jet aircraft that might travel at speeds of around Mach 0.8. At such high speeds, the loading on the spoiler is significantly increased, requiring the spoiler to have increased strength and rigidity so that it does not deform in an undesirable manner when in use.

Control surfaces, such as vertically deployed spoilers, need to be of a certain height such that they produce their desired effect. Lack of local space in the wing, particularly near the leading edge (or the trailing edge) for example, for stowing control surfaces presents an obstacle when considering the use of vertically deployed spoilers.

Deploying a spoiler vertically, requires an opening (e.g. slot) in the wing through which the spoiler deploys. The spoiler needs to be large enough to perform its function and the opening needs to be large enough to allow deployment of the spoiler. Having such openings on the wing requires the wing to be strengthened in the region around the openings, which can add mass. The presence of an opening also presents issues around airflow over the wing, if the opening is not closed in some manner when the spoiler is stowed.

It is known to use an increased number of vertically deployed control surfaces of reduced width, and therefore provide more openings each being smaller than might otherwise be required, which can assist with meeting the structural requirements of the wing surface. The English Electric Canberra is a British jet-powered medium bomber developed in the 1940s with such an arrangement. It uses vertically deployed elongate, narrow, finger-like members as airbrakes. The height of such fingers is however limited by the depth of the wing at the region in which the fingers are located.

The disclosure herein seeks to mitigate one or more of the above-mentioned problems. Alternatively or additionally, the disclosure herein seeks to provide an improved aircraft control surface system for an aircraft structure, an improved pop-up finger spoiler for an aircraft wing, an improved aircraft structure and an improved method of moving a deployable control surface member between a retracted position and a deployed position.

SUMMARY

The disclosure herein provides, according to a first aspect, an aircraft control surface system for an aircraft structure. The system comprises a deployable control surface member and a deployment mechanism for moving the deployable control surface member between a retracted position and a deployed position. In the retracted position, at least a portion of the deployable control surface member is curled to facilitate stowage within the aircraft structure. In the deployed position, at least a portion of the deployable control surface member is uncurled so that the deployable control surface member acts as a control surface which extends from a surface of the aircraft structure.

In embodiments, the deployable control surface member can therefore be of the required length (e.g. height) to produce the desired effect of a control surface while still being able to be stowed in the aircraft structure. In embodiments, it has been found that it is possible for the deployable control surface member to be rigid enough to withstand the high loads, perhaps loads of up to 100N for large aircraft, it will be exposed to when in use while also not requiring an aperture in the aircraft structure of a size that would require additional local structural reinforcement. This can be achieved, as described in further detail below, by the control surface having a curved cross-section, at least when deployed.

In the deployed position, the uncurled portion of the deployable control surface may extend along a straight line. The uncurled portion may have greater resistance to bending when faced with airflow in one direction (e.g. the direction the air flows relative to the deployed control surface when in use) than in the opposite direction.

The control surface may be a spoiler. Preferably, the control surface is a finger spoiler—i.e. its length is greater than its width. The control surface may deploy in a direction that is parallel to its length when deployed. The aircraft structure from which the control surface extends is preferably a wing of an aircraft (or the tail of an aircraft). The length of the spoiler that is extended beyond the surface of the aircraft structure (height of the spoiler) may be between 50 mm and 250 mm (possibly from 60 mm to 200 mm). The control surface may be formed of metal, possibly steel. The metal may be aluminium, or an aluminium alloy.

Preferably, the deployable control surface member, when it is in the retracted position, is fully stowed within the aircraft structure. When it is in the retracted position, the distal end of the deployable control surface member may be coplanar with an upper surface of the aircraft structure. In embodiments, it may therefore be that the distal end of the member is flush with an upper surface of the aircraft wing through which it deploys, thus closing over the opening that would otherwise be open.

When the deployment mechanism is activated, the deployable control surface member may extend out of a hole, slot or aperture in the aircraft structure. When the deployable control surface member is in the deployed position, it may have a first length (the first length being the distance measured along a straight portion of the control surface member from its distal end which is outside the aircraft structure to the opposite end of the straight portion which may be partially within the surface of the aircraft structure) which may be greater than the local depth of available space within the aircraft structure. It may be that the distance by which the deployed control surface member extends beyond the surface of the aircraft structure is greater than the local depth of available space within the aircraft structure (or greater than 75% of the local depth of available space). The local depth is especially restricted in certain areas of the aircraft structure, particularly in the trailing edge and leading edge of an aircraft wing. The local depth of the available space within the aircraft structure may be between 30 mm and 200 mm.

The deployable control surface member may be considered to have a length and a width, its width being transverse to its length, the length preferably being greater than the width. Preferably, when the deployable control surface member is in the deployed position, the length of the member that is extended beyond the surface of the aircraft structure is greater than its width. The total length of the deployable control surface member may be between 60 mm and 200 mm. The width of deployable control surface member may be between 15 mm and 75 mm. The ratio of the total length of the deployable control surface member to its width may be between 2 and 5. The ratio of its height above the aircraft surface to its width may be between 1.5 and 3.

Preferably, the surface area of the deployable control surface member is generally rectangular in shape when it is deployed (optionally with a rounded end, or otherwise not perfectly straight end), the longer side of the rectangle being in a direction extending away from the aircraft structure in a direction perpendicular the surface of the aircraft structure. The shape of the deployable control surface member enables the deployable control surface member to disrupt lift to the required degree yet does not require additional local reinforcement of the aircraft structure as the width of the hole or aperture in the aircraft structure through which it extends may be sufficiently narrow/small.

Preferably, the deployment mechanism comprises a shaft, the deployable control surface member being mounted on and at least partially curled around the shaft, for example at least when in the retracted position.

The shaft may be connected to a motor that drives rotation of the shaft. The motor may therefore drive the movement of the deployable control surface member between its retracted and deployed positions.

When the deployable control surface member is in the retracted position, an inner surface of at least part of at least part of the curled deployable control surface member is against an outer surface of the shaft.

The shaft may have a circular cross section. The shaft may have a cross section which varies along the axis of the shaft. The shaft may for example have a rounded formation (e.g. a ball portion), round which the deployable control surface member is curled. The rounded formation may have a circular cross-section that with, increasing distance along the axis of the shaft, increases to a maximum and then decreases. The rounded formation may for example be in the form of a ball portion, which may be substantially spherical, the diameter of the ball portion being greater than the diameter of the cross-section of the shaft. The rounded formation may have an outer surface with a variable radius of curvature along the width of the deployable control surface member. The cross section of the deployable control surface member may be curved when the deployable control surface member is in the retracted position such that the curvature of the cross section matches the curvature of the rounded formation. The cross section of the deployable control surface member may also be curved when deployed (discussed further below). The curvature of the cross section of the deployable control surface member when in the retracted position may be substantially the same as the curvature of the cross section of the deployable control surface member when deployed. The maximum radius of the rounded formation on the shaft (e.g. ball section) in a direction parallel to the radius of the axis of the shaft may be between 15 mm and 90 mm and the radius of the shaft may be between 10 mm and 50 mm.

Preferably, when the deployable control surface member is in the retracted position, an inner surface of at least part of the curled deployable control surface member is against an outer surface of the shaft. Preferably, when the deployable control surface member is in the retracted position, an inner surface of at least part of the curled deployable control surface member is against an outer surface of the rounded formation of the shaft.

Preferably, the contact between the inner surface of the at least part of the curled deployable control surface member and the outer surface of the shaft is a contact area such that, at the cross-section of the shaft, the inner surface is in contact with the outer surface for an arc of the perimeter of the shaft or of the perimeter of the ball portion. The arc of contact when the deployable control surface member is in the deployed position, being preferably between 90 and 180 degrees, may be less than the arc of contact when the deployable control surface member is in the retracted position, being preferably at least 180 degrees.

Preferably, the deployable control surface member comprises a first location at its distal end and a second location further along its length such that, when the deployable control surface member is in the deployed position, the second location is closer to the surface of aircraft structure; wherein, when the deployable control surface member is in the deployed position, the deployable control surface member is straight between its first and second location; and wherein the distance between the first and second location is greater when the deployable control surface member is in the deployed position than when the deployable control surface member is in the retracted position. In embodiments, this may have the advantage of the deployable control surface member taking up a reduced envelope of space in at least one direction.

The first location at the distal end of the deployable control surface member may be the end furthest from the aircraft structure when the deployable control surface member is in the deployed position. The second location of the deployable control surface member may be in line with the upper surface of the aircraft structure from which it extends when the deployable control surface member is in the deployed position. Alternatively, or additionally, the second location may be at the end of a straight portion of the deployable control surface member when deployed, the second location being at the opposite end of the straight portion from the distal end. The distance between the first and second locations may be at least 90 mm.

Preferably, the deployable control surface member further comprises a third location, located between the first location and the second position; wherein both the distance between the first and third locations and the distance between the third and second locations are greater when the deployable control surface member is in the deployed position than when the deployable control surface member is in the retracted position.

Preferably, when the deployable control surface member is in the deployed position, the deployable control surface member is straight between all of its first location, second location and third location.

Preferably, the deployment mechanism is configured to move the deployable control surface member to a position that is between the retracted position and the deployed position.

This may be facilitated by the motor, to which the shaft is connected, being stoppable at any point along its rotation. This allows the length of the deployable control surface member that is extended beyond the surface of the aircraft structure to be variable.

Preferably, the cross section of the deployable control surface member is curved when the deployable control surface member is in the deployed position. It may be curved in a way such that the curvature of the cross section has a concave surface that is presented to the airflow when it is acting as a control surface.

In embodiments, the deployable control surface member when in the deployed position has the stiffness required so that, when its concave surface is presented to the airflow, it does not bend from the loading of the airflow. The concave surface assists in providing the necessary rigidity.

Preferably, the curvature of the cross section has a minimum radius of curvature and the deployment mechanism has a curl radius. It may be that the curl radius is greater than the minimum radius of curvature of the cross section.

The curvature of the cross section may be variable along the width of the deployable control surface member. The minimum radius of curvature of the cross-section may be the radius of curvature at the center point along the width of the deployable control surface member. The minimum radius of curvature of the deployable control surface member may be between 15 mm and 45 mm. The curl radius may be between 30 mm and 60 mm. Preferably, the curl radius is greater than the radius of curvature of the deployable control surface member by a factor of 1.5.

Preferably, the deployable control surface member has a thickness, the thickness of the deployable control surface member being between 0.1 mm and 2 mm. Preferably, the radius of curvature is greater than the thickness by a factor between 5 and 15.

Preferably, the rounded formation of the shaft mentioned above has an outer surface with a radius of curvature that is substantially equal to the radius of curvature of the deployable control surface member at points along the width of the deployable control surface member such that, when it is in the retracted position, an inner surface of the deployable control surface member is against the outer surface of the ball section of the shaft.

The radius of the rounded formation at its center-point (measured from the center of axis of the shaft to the external surface of the rounded formation) may be substantially equal to the curl radius.

Preferably, the aircraft control surface system further comprises at least one other deployable control surface member such that the aircraft control surface system comprises a plurality of deployable control surface members which are configured to be distributed along the aircraft structure. The gap between adjacent deployable control surface members may be greater than half of the width of one of the control surface members. There may be two or more spaced apart groups of deployable control surface members, each group having three or more deployable control surface members, the separation of the groups from each other being greater than the separation between adjacent control surface members in a group. There may be two or more spaced apart rows of deployable control surface members, the rows for example being spaced apart in the spanwise direction and/or in the chordwise direction. There may be more than five deployable control surface members spaced apart in the spanwise direction.

Preferably, the width of one of the deployable control surface members is equal to or less than the distance between that deployable control surface member and an adjacent deployable control surface member.

In embodiments, it is easier therefore to ensure that the aircraft structure maintains its structural rigidity as there is substantial material or skin able to be provided between each aperture/hole through which the adjacent deployable control surface members extend through.

Preferably, a single source of driving force is configured to drive the deployment mechanism for moving two or more of the deployable control surface members.

The deployable control surface members may be mounted on a single shaft. The deployable control surface members may be mounted on the shaft in such a way that they are deployed at different times in response to the single source of driving force. For example, this could be achieved by varying the clocking angle of each deployable control surface member i.e. the deployable control surface members may be wound around the shaft with different effective phase angles. Alternatively or additionally, this could be achieved by the shaft having a variable diameter along its length.

The aircraft control surface system may further comprise an opening, particularly a slot in the aircraft structure through which the deployable control surface member extends. Preferably, the shape of the slot is substantially the same as the shape of the cross-section of the deployable control surface member i.e. it has a curved profile. The dimensions (width, length and thickness) of the slot may be between 0.1 mm and 2 mm greater than the equivalent dimensions of the deployable control surface member such that the member can pass through the slot when it is moving to its deployed position. The slot also being curved provides the deployable control surface member with the rigidity required such that it does not bend when exposed to airflow when it is in use.

According to a second aspect of the disclosure herein there is also provided a pop-up finger spoiler for an aircraft wing, the spoiler having a length, a width and a thickness, and being moveable between a deployed configuration and a stowed configuration. The spoiler may be deployed in a direction along its length. The spoiler when so deployed has a cross-section, transverse to its length, with a concave surface having a curvature which gives the spoiler rigidity to resist bending about an axis across its width. The spoiler when stowed has at least a portion having a cross-section, transverse to its width, with a convex profile having a curvature which allows the spoiler to be compactly stowed in the wing (e.g. in a curled up configuration, for example around at least part of a shaft for accommodating the spoiler when stowed). It will be appreciated that the convex profile and concave surface referred to here, as between when the spoiler is deployed and when the spoiler is stowed, refer to the curvature of the spoiler in two different directions.

It may be that the spoiler when stowed has a cross-section, transverse to its length, with a profile having a greater curvature compared to when it is deployed. Alternatively, it may be that the spoiler when stowed has a cross-section, transverse to its length, with a profile having substantially the same curvature as when it is deployed.

According to a third aspect of the disclosure herein there is also provided an aircraft structure comprising the aircraft control surface system as described or claimed herein.

According to a fourth aspect of the disclosure herein there is also provided an aircraft structure in the form of at least part of an aircraft wing, wherein the wing comprises the aircraft control surface system as described or claimed herein. There may be a plurality of such deployable control surface members, which are distributed along the aircraft structure, for example such that the space between each deployable control surface member is greater than the width of one of the plurality of deployable control surface members.

According to a fifth aspect of the disclosure herein there is also provided an aircraft structure comprising the pop-up finger spoiler as described or claimed herein.

According to a sixth aspect of the disclosure herein there is also provided an aircraft including the aircraft structure as described or claimed herein.

According to a seventh aspect of the disclosure herein there is also provided method of moving a deployable control surface member between a retracted position and a deployed position via an opening in an aircraft structure. The deployable control surface member may be one as described or claimed herein. In such a method, the deployable control surface member, when in its deployed position, extends from the opening such that a distal end of the deployable control surface member is presented to airflow local to the aircraft structure. There may be defined a first distance measured along a straight portion of the deployable control surface member from the distal end, along the length of the deployable control surface member, to an opposite end of the straight portion. In such a method it may be the case that the deployable control surface member is stored in its retracted position so that the deployable control surface member is contained within an internal volume of the aircraft structure. The internal volume may have a maximum depth dimension that is less than the first distance, so that for example there may be an efficient use of space when the control surface member is stored in its retracted position.

Preferably, the cross section of the deployable control surface member is curved and presents a concave surface to local airflow such that the deployable control surface member is rigid when it is in the deployed position.

Preferably, the method comprises a step of rotating a shaft round which the deployable control surface member is curled, when it is in the deployed position, such that it is contained within the internal volume of the aircraft structure.

Preferably, a plurality of deployable control surface members are curled around the shaft such that the step of rotating the shaft moves at least one of the plurality of deployable control surface members to the deployed position at a different time to another of the plurality of deployable control surface members.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft may be a commercial aircraft, for example a commercial passenger aircraft, for example a single aisle or twin aisle aircraft.

It will of course be appreciated that features described in relation to one aspect of the disclosure herein may be incorporated into other aspects of the disclosure herein. For example, the method of the disclosure herein may incorporate any of the features described with reference to the apparatus of the disclosure herein and vice versa.

BRIEF DESCRIPTION OF THE DRAWINGS

Embodiments of the disclosure herein will now be described by way of example only with reference to the accompanying schematic drawings of which:

FIG. 3 shows an isometric view of an aircraft control surface system according to a first embodiment;

FIG. 5 shows a top view of a control surface member of the aircraft control surface system according to the first embodiment;

DETAILED DESCRIPTION

Figure 1:
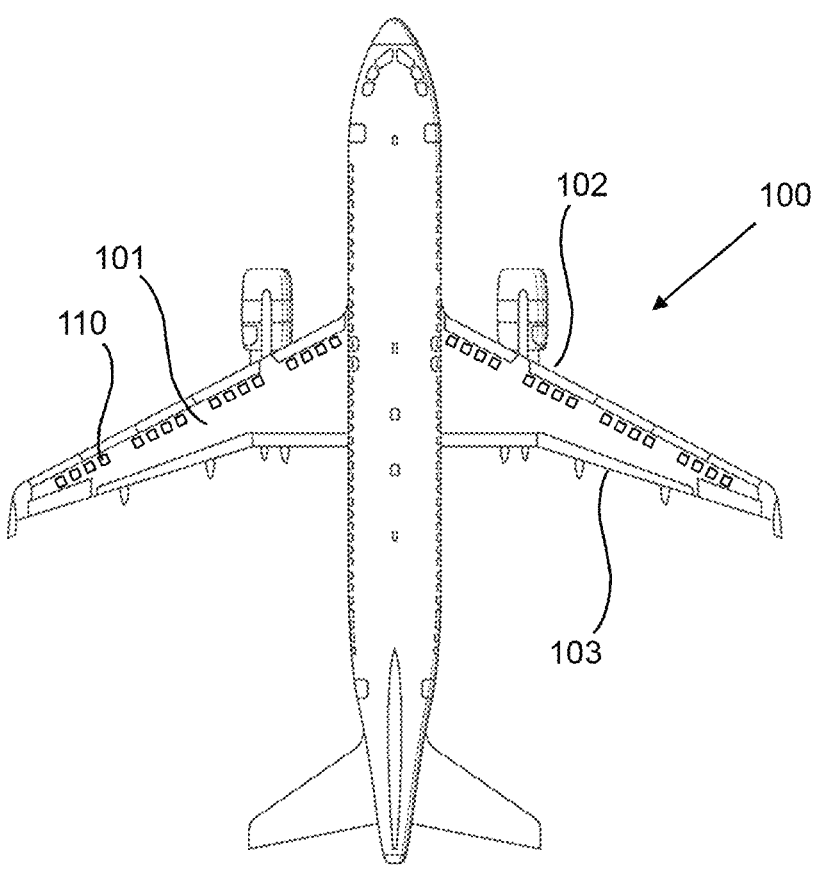
FIG. 1 shows a plan view of an aircraft having an aircraft structure wherein the aircraft and aircraft structure are suitable for use with an aircraft control surface system of an embodiment of the disclosure herein.

FIG. 1 shows an aircraft 100 comprising two wings 101 each with a leading edge 102 and a trailing edge 103, each wing being an example of an aircraft structure. A plurality of aircraft control surfaces 110 are arranged on the upper surface of, and along the leading edge 102, of the wings 101. There are multiple spaced-apart groups of control surfaces 110, each group comprising multiple spaced apart deployable aircraft control surfaces 110, the number and arrangement of which being shown schematically only in FIG. 1. In practice there may be 4 groups of 20 control surfaces, with each control surface being 30 mm wide (with its width being aligned with the leading edge of the wing). The adjacent control surfaces in a group may be separated by 30 mm, forming a group of control surfaces that is 900 mm wide. The neighboring control surfaces between adjacent groups may be separated by at least 200 mm. The aircraft 100 travels at speeds of up to Mach 0.8.

Figure 2:
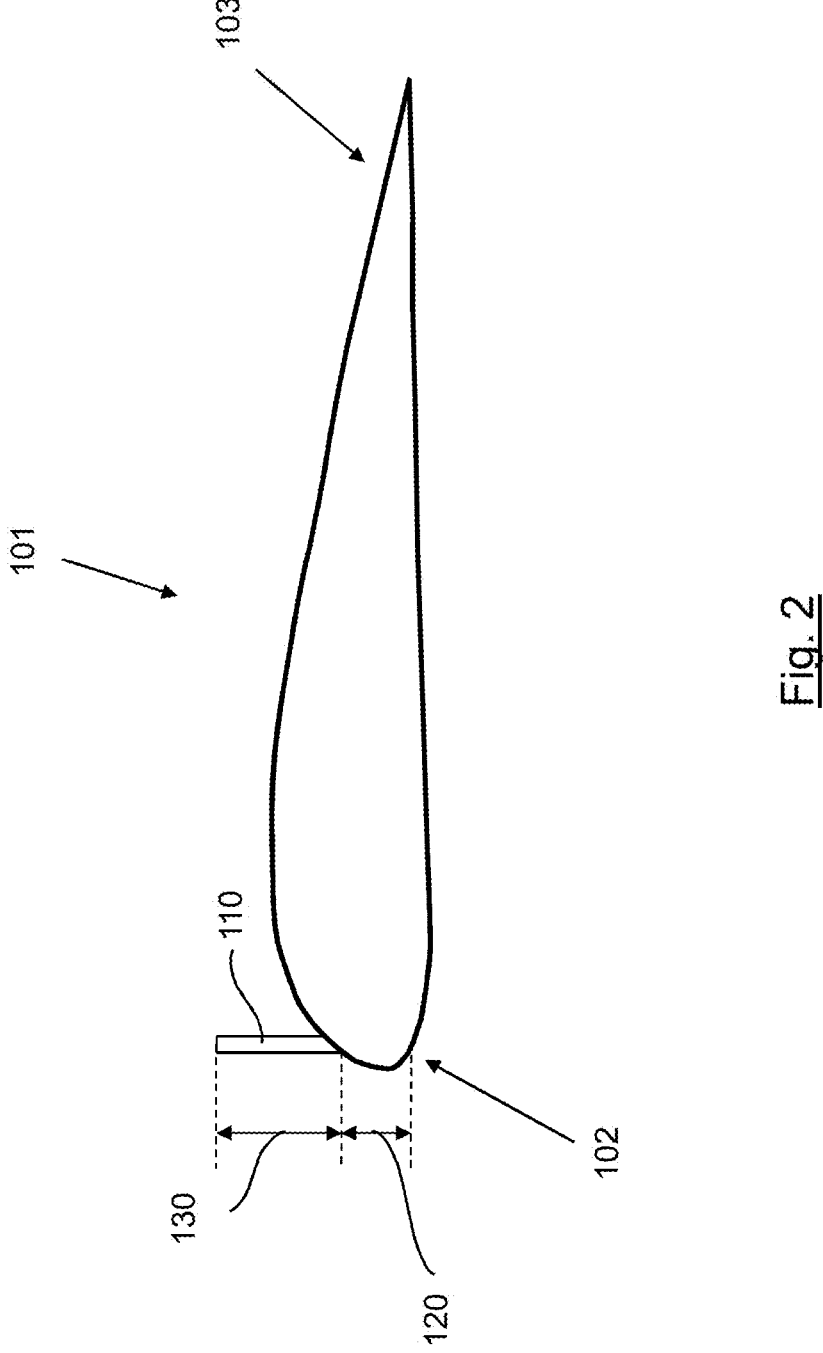
FIG. 2 shows a side view of an aircraft structure, in the form of an aircraft wing, wherein the aircraft structure is suitable for use with an aircraft control surface system of an embodiment of the disclosure herein.

FIG. 2 shows a cross-section of an aircraft structure 101. The aircraft structure 101 is a wing of an aircraft 100 and has a leading edge 102 and a trailing edge 103. An illustrative control surface member 110 is shown at the leading edge 102 of the aircraft structure 101. The illustrative control surface member 110 must have a required height 130 so that it produces its desired effect when in use. The local depth within the aircraft structure 101 beneath the illustrative control surface member 110 is shown by arrow 120. The required height 130 of the illustrative control surface member 110 may be greater than can be readily accommodated by the local depth 120 in the aircraft structure 101.

An aircraft control surface system 200 in accordance with a first embodiment of the disclosure herein is now described with reference to FIGS. 3 to 6*b*.

The aircraft control surface system 200 is located at the leading edge 102 of an aircraft structure 101. The aircraft control surface system 200 comprises the deployable finger spoiler 210 and the shaft 220. FIG. 3 shows the finger spoiler in a deployed position, with a majority of the finger spoiler extending vertically in a straight line from the upper surface of the wing and with a minority of the finger spoiler curled around the shaft 220.

The length of the shaft 220 is parallel to the edge of the leading edge 102 of the aircraft structure 101. The shaft 220 has a ball portion 221, the maximum radius 224 of the ball portion 221 (the radius measured parallel to the radius of the shaft) is 45 mm and the radius of the shaft 220 is 25 mm. The ball portion 221 is fixed to the shaft 220 such that it rotates with the shaft 220. A motor (not shown) drives rotation of the shaft 220 and hence drives rotation of the ball portion 221. The shaft 220 is made from composite material and the ball portion 221 is made from aluminium.

Figures 4A, 4B:
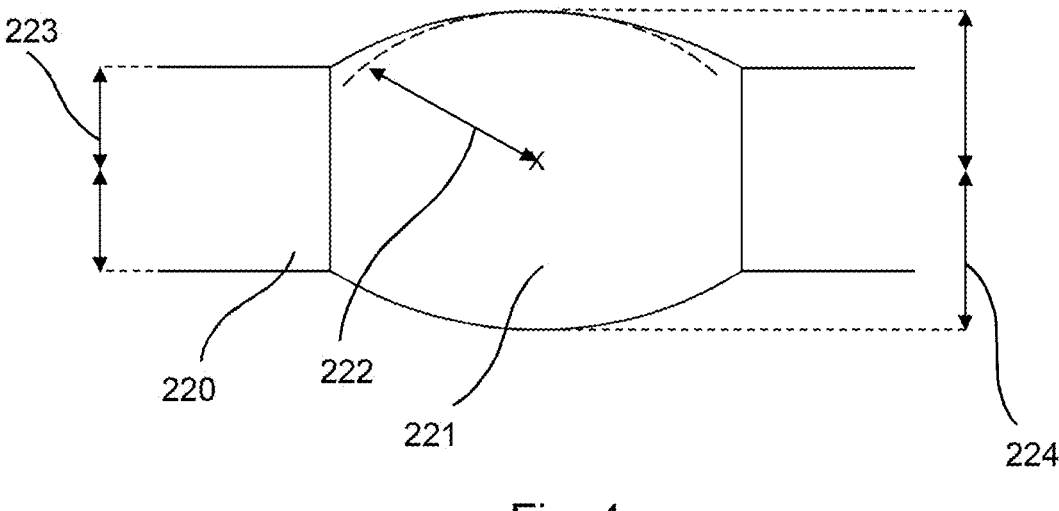
FIG. 4a shows a front view of the shaft of the aircraft control surface system according to the first embodiment.
FIG. 4b shows a side view of the shaft of the aircraft control surface system according to the first embodiment.

The cross-section (see FIG. 5 also) of the portion of the finger spoiler 210 that is deployed is curved with a (minimum) radius of curvature 211 of 30 mm and has an overall width 45 mm. The deployable finger spoiler 210 is mounted on the shaft 220 such that the deployable finger spoiler 210 curls around the ball portion 221 of the shaft 220. With reference to FIGS. 4*a* and 5, the radius of curvature 222 of the outer surface of the ball portion 221 (when viewed in cross-section about a plane that contains the shaft axis) is substantially equal to the radius of curvature 211 of the cross section of the deployable finger spoiler 210 at corresponding points along the length of the shaft 220 such that the concave inner surface of the deployable finger spoiler 210 sits against the curved outer surface of the ball portion 221. The finger spoiler is formed of stainless steel and has a Young's Modulus of 200 GPa and, when it is straight, is able to withstand the bending moment caused by air pressures from flight without bending from its straightened state, as a result of its dimensions.

The radius 224 of the ball portion 221, 45 mm, at its center-point i.e. halfway along its length in the direction along the shaft 220, defines the curl radius 224 of the deployable finger spoiler 210.

Figures 6A, 6B:
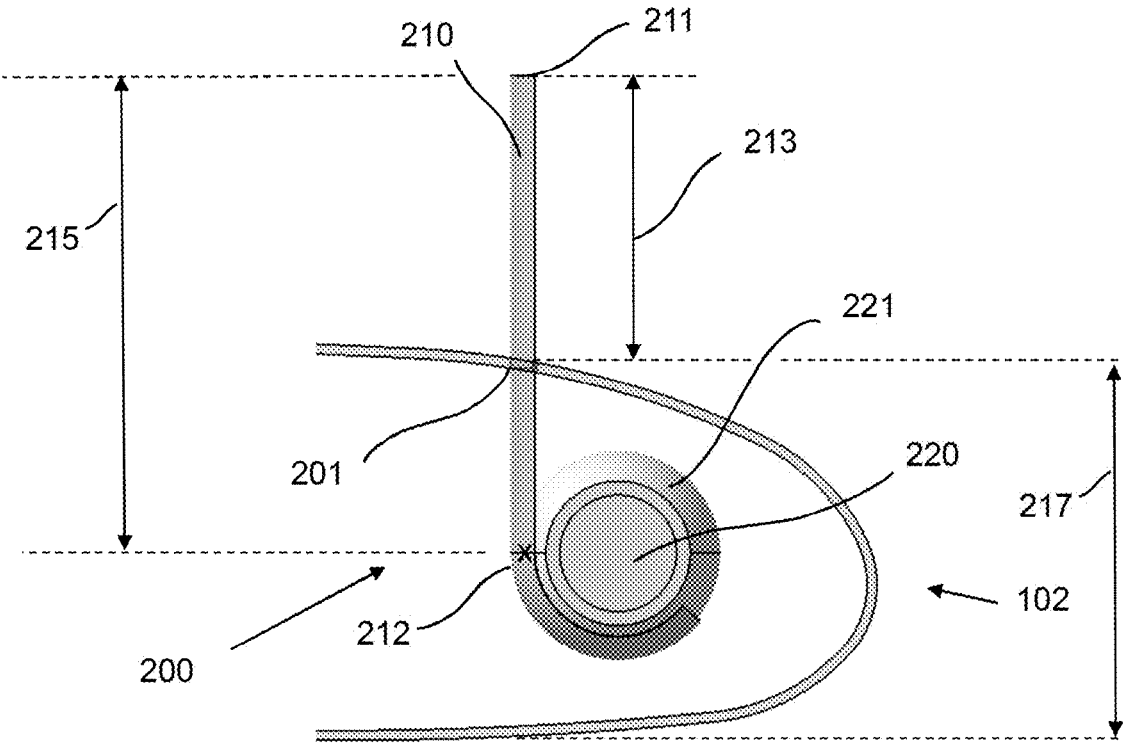
FIG. 6a shows a side view of the aircraft control surface system according to the first embodiment, in a deployed position.
FIG. 6b shows a side view of the aircraft control surface system according to the first embodiment, in a retracted position.

The deployable finger spoiler 210, when in the deployed position as shown in FIG. 6*a*, extends beyond the upper surface of the aircraft structure 101 by a distance 213, 100 mm. The straight section of the spoiler 210 when deployed has a length 215 of 150 mm and extends from a first point at its distal end 211 to a second point 212. The local depth 217 of the wing is 90 mm. Thus, it will be understood that the straight section of the spoiler 210 when deployed is longer than the wing is deep. The length of the deployed spoiler 210 that is exterior to the wing is comparable to the local depth 217 of the wing being about 110% of that depth 217.

When in use, a straight portion of the deployable finger spoiler 210 extends from its distal end 211 via the slot 201 to a point (e.g. the second point 212) within the structure of the wing. There is therefore a vertically extending straight section of the spoiler 210 above the upper surface of the wing 201, which is exposed to the local airflow and is able to act as a control surface. The finger spoiler 210 is exposed to airflow while traveling at speeds of Mach 0.8 and, as a result, the finger spoiler 210 is under forces of up to 150N and a bending moment of up to 7 Nm. As a result of the concave shape of the cross-section of the finger spoiler, and its other material properties and dimensions, the finger spoiler is able to maintain a relatively rigid vertically arranged configuration despite also being able to be retracted into a curled configuration.

The deployable finger spoiler 210, when in the retracted position as shown in FIG. 6*b*, is completely contained within the aircraft structure 101, with a majority of its length curled around the shaft 220. When in this configuration the slot 201 is closed off by the distal end of the spoiler 210, which may be shaped to ensure that no gaps are present on the upper surface of the wing by the slot 201. As mentioned above, the local depth of the aircraft wing 101 is 90 mm. This is greater than the height of the finger spoiler with the shaft (i.e. the height 218 of the notional envelope which contains the shaft and finger spoiler when retracted). It will also be noted by comparing FIG. 6*a* with FIG. 6*b* that the distance 213 between the first distal end 211 and the second point 212 when the spoiler is deployed is greater than the distance 219 between the first distal end 211 and the second point 212 when the spoiler is retracted, as a result of the curling of the spoiler 210 around the shaft 220.

In use, the motor (not shown) rotates the shaft 220 in the anti-clockwise direction, when viewed as in FIGS. 6*a* and 6*b*, to lower the deployable finger spoiler 210 from the deployed position (FIG. 6*a*) to the retracted position (FIG. 6*b*). The portion of the deployable finger spoiler 210 that is straight decreases and the portion that is curled around the ball portion 221 increases. The rotation of the shaft, caused by the motor, is fast enough that the spoiler 210 can be moved from its fully retracted position to its fully deployed position in a fraction of a second. This is fast enough for the spoiler to be used as a load alleviation device on the wing to react to temporary gusts that might otherwise cause higher loads than desirable on the wing.

In use, the deployable finger spoiler 210 is in the retracted position then, in response to a signal (which may depend on the detection of a relevant gust event or loading threshold being exceeded), the motor rotates the shaft 220 in the clockwise direction, when viewed as in FIGS. 6*a* and 6*b*, to move the deployable finger spoiler 210 from the retracted position to the deployed position. When the deployable finger spoiler 210 is in the deployed position, it is exposed to local airflow.

FIG. 4*a* shows the shaft 220 and its ball portion 221. FIG. 4*a* also shows the radius of curvature 222 of the ball portion 221 (when viewed in cross-section in a plane that contains the shaft axis). FIG. 4*b* shows the radius 223 of the shaft 220 and also the maximum radius 224 of the ball portion 221 (the radius of the ball portion 221 in the radial direction for the shaft).

FIGS. 3 and 5 show the direction of airflow 250 to which the deployable finger spoiler 210 is exposed. The airflow 250 generally travels into the concave surface of deployable finger spoiler 210 and the deployable finger spoiler 210 disrupts the airflow 250.

The radius of curvature 211, the curl radius 224 and the thickness 212 of the deployable finger spoiler 210 are chosen such that, in use, the deployable finger spoiler 210 has the required resistance to a bending moment, approximately 7 Nm to not bend backwards in use while still being compact enough in its retracted position to be stored in the aircraft structure 101.

The slot 201 in the aircraft structure 101 through which the deployable finger spoiler 210 extends, has a curved profile that is substantially the same shape as the cross-section of the deployable finger spoiler 210. In use, airflow 250 moves into the concave section of the deployable finger spoiler 210 and, as a result, the convex surface of the deployment mechanism is urged against the concave edge of the slot 201. As such the slot 201 supports the deployable finger spoiler 210, the shape of the slot 201 improving the rigidity of the deployable finger spoiler 210 when it is in the deployed position.

It will therefore be appreciated that the embodiment provides a finger which can, in certain variations, protrude from the upper surface by more than the wing depth (or at least have a straight section that is longer than the local wing depth) as a result of the non-rigid design, which can be wound round the shaft when stowed, but as a result of the concave cross-sectional profile when deployed still be sufficiently rigid to withstand being bent when in the airflow.

Methods in accordance with second and third embodiments of the disclosure herein are now described with reference to FIGS. 7 and 8.

Figure 7:
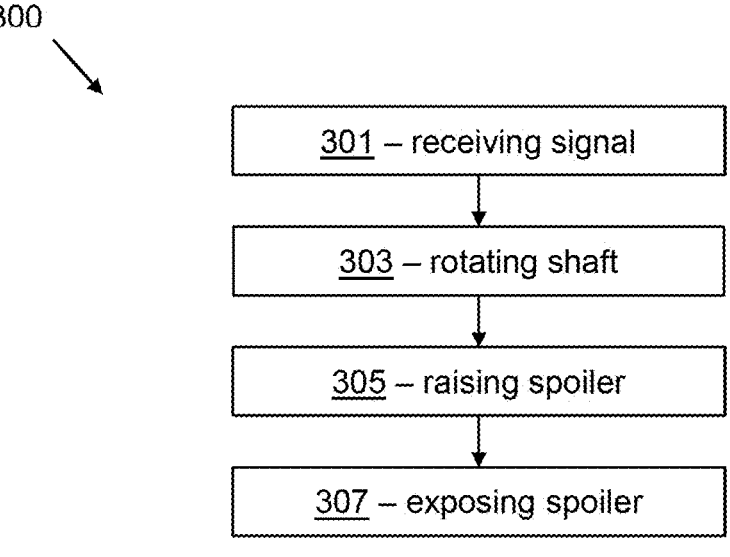
FIG. 7 shows a flowchart of a method of moving an aircraft control surface member from a retracted position to a deployed position according to a second embodiment.

FIG. 7 shows a flowchart of a method 300 of moving an aircraft control surface, specifically a spoiler, from a retracted position to a deployed position to alleviate load on a wing of an aircraft. The spoiler may be one as described in relation to any of the other Figures. The method 300 has a first step 301 in which a signal is received. The method 300 has a second step 303 in which, in response to the signal, a motor rotates a shaft. The spoiler is curled around the shaft such that, as the shaft rotates, it moves vertically upwards out of the aircraft structure in which it is stowed. As such, the method 300 has a third step 305 of fully deploying the spoiler in its vertically raised position. As a result the spoiler is exposed to local airflow (represented by box 307). As such the spoiler disrupts airflow and alleviates the loading on the wing by reducing the lift.

Figure 8:
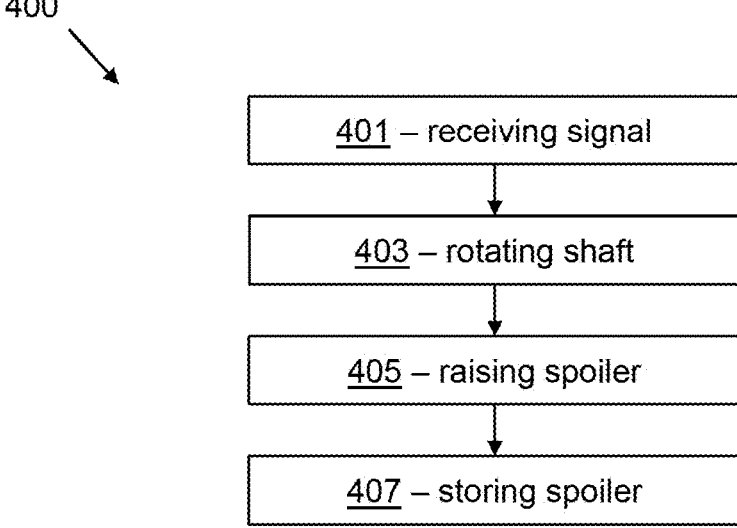
FIG. 8 shows a flowchart of a method of moving an aircraft control surface member from deployed position to a retracted position according to a third embodiment.

FIG. 8 shows a flowchart of a method 400 of moving an aircraft control surface, specifically a spoiler, from a deployed position to a retracted position to store the spoiler in the wing of an aircraft. The method 400 has a first step 401 in which a signal is received. The method 400 has a second step 403 in which, in response to the signal, a motor rotates a shaft in the opposite direction to that in the method shown in the flowchart of FIG. 7. Part of the spoiler is curled around the shaft such that when the shaft rotates, more of the spoiler curls around the shaft, the spoiler moving vertically downwards into the aircraft structure where it will be stowed. This is shown in FIG. 7 as a third step 405 of lowering the spoiler. Box 407 represents the stage of fully storing the spoiler in the aircraft wing in that the spoiler is fully retracted into the interval volume of the wing.

In both the methods illustrated by FIGS. 7 and 8 spoiler, when deployed, has a straight section that extends through an opening in the wing to a distal end in the airflow. The spoiler, when retracted and stowed, is curled round the shaft such that the spoiler is contained within a notional 3-D space inside the wing, the notional 3-D space having a maximum depth that is less than the length of that straight section of the spoiler when deployed.

While the disclosure herein has been described and illustrated with reference to particular embodiments, it will be appreciated by those of ordinary skill in the art that the disclosure herein lends itself to many different variations not specifically illustrated herein. By way of example only, certain possible variations will now be described.

An embodiment with a finger spoiler 210 is disclosed however there may be embodiments with other types of aircraft control surfaces instead of a finger spoiler, for example a control surface comprising a panel or a rudder.

The radius of curvature 211 of the deployable finger spoiler 210 may be infinite, i.e. the deployable finger spoiler 210 may be substantially straight in cross-section when deployed, and it might have the required stiffness from another type of reinforcement such as a back plate which the deployable finger spoiler 210 pushes against when it is exposed to airflow. In such an embodiment, the shaft 220 may not comprise a ball portion 221. The shaft 220 may have a substantially uniform cross-section along its length.

As mentioned above, there may be a plurality of deployable finger spoilers on a wing. At least two or more finger spoilers may be mounted on the same shaft. There may be multiple ball portions along the same shaft, around which the deployable finger spoilers are (at least partially) curled when stowed. A single motor may rotate such a shaft with multiple spoilers.

The deployable finger spoilers may be mounted on a single shaft (or on multiple shafts) such that they are deployed at the same time or at different times in response to a signal. This feature may also have applications in control surfaces or spoilers which are not disclosed in the description, for example rigid spoilers which do not have a reduced overall height when stowed in comparison to when they are deployed. Thus, some embodiments may be described as being an aircraft control surface system for an aircraft structure, the system comprising multiple deployable control surface members (which may or may not be in the form of the finger spoilers described above and/or the curled members claimed herein) and a common deployment mechanism for moving each of the deployable control surface members between (a) a retracted position, in which at least a portion of the deployable control surface member is stowed within the aircraft structure, and (b) a deployed position, in which the at least a portion of the deployable control surface member acts as a control surface which extends from a surface of the aircraft structure, and wherein actuation of the common deployment mechanism causes successive and separate deployment of the deployable control surface members in a predefined sequence. For example, the sequence may be defined by the clocking angle of each deployable control surface member, if and when in the form of finger spoilers that curl found a common shaft. Other ways of achieving the sequenced deployment may be provided however, for example by a suitably arranged cam arrangement and rigid deployable finger spoilers.

Multiple spoilers may each be separately controlled such that they can be deployed one-by-one and/or independently of each other.

The spoilers—or other moveable control surface(s)— could be positioned at other locations on the wing, or on another part of the aircraft.

Where in the foregoing description, integers or elements are mentioned which have known, obvious or foreseeable equivalents, then such equivalents are herein incorporated as if individually set forth. Reference should be made to the claims for determining the true scope of the disclosure herein, which should be construed so as to encompass any such equivalents. It will also be appreciated by the reader that integers or features of the disclosure herein that are described as preferable, advantageous, convenient or the like are optional and do not limit the scope of the independent claims. Moreover, it is to be understood that such optional integers or features, while of possible benefit in some embodiments of the disclosure herein, may not be desirable, and may therefore be absent, in other embodiments.

The term 'or' shall be interpreted as 'and/or' unless the context requires otherwise.

It should be understood that modifications, substitutions, and alternatives of the present invention(s) may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft control surface system for an aircraft structure, the system comprising:
a plurality of finger spoilers that are distributed along the aircraft structure, each finger spoiler of the plurality of finger spoilers having a length and a width, wherein the width is transverse to the length and the length is greater than the width; and
a deployment mechanism for moving the finger spoiler between:
a retracted position, in which at least a portion of the finger spoiler is curled to facilitate stowage within the aircraft structure; and
a deployed position, in which the at least a portion of the finger spoiler is uncurled, so that the finger spoiler acts as a control surface which extends from a surface of the aircraft structure;
wherein the width of a first finger spoiler of the plurality of finger spoilers is equal to or less than a distance between the first finger spoiler and a finger spoiler of the plurality of finger spoilers that is adjacent to the first finger spoiler; and
wherein the deployment mechanism is configured for being driven by a single source of driving force for moving two or more of the plurality of finger spoilers.

2. The aircraft control surface system of claim 1, wherein:
when the finger spoiler is in the deployed position, a length of the finger spoiler that is extended beyond the surface of the aircraft structure is greater than the width of the finger spoiler; or
the deployment mechanism is configured to move the finger spoiler to a position that is between the retracted position and the deployed position.

3. The aircraft control surface system of claim 1, wherein:
the deployment mechanism comprises a shaft; and
the finger spoiler is mounted on and at least partially curled around the shaft.

4. The aircraft control surface system of claim 3, wherein, when the finger spoiler is in the retracted position, an inner surface of the at least a portion of the finger spoiler is against an outer surface of the shaft.

5. The aircraft control surface system of claim 1, wherein:
the finger spoiler comprises a first location, defined at a distal end of the finger spoiler, and a second location, which is spaced apart from the first location along the length of the finger spoiler, such that, when the finger spoiler is in the deployed position, the second location is closer to the surface of the aircraft structure;
when the finger spoiler is in the deployed position, the finger spoiler is straight between the first location and the second location; and
a distance between the first location and the second location is greater when the finger spoiler is in the deployed position than when the finger spoiler is in the retracted position.

6. The aircraft control surface system of claim 5, wherein:
the finger spoiler further comprises a third location, located between the first location and the second location;
a distance between the first location and the third location is greater when the finger spoiler is in the deployed position than when the finger spoiler is in the retracted position; and
a distance between the second location and the third location is greater when the finger spoiler is in the deployed position than when the finger spoiler is in the retracted position.

7. The aircraft control surface system of claim 1, wherein a cross section of the finger spoiler is curved when the finger spoiler is in the deployed position, such that a curvature of the cross section comprises a concave surface that is presented to airflow when in use.

8. An aircraft structure in a form of at least part of an aircraft wing, comprising the aircraft control surface system according to claim 1, wherein the finger spoiler is a pop-up finger spoiler and comprising, in addition to the pop-up finger spoiler, at least one additional pop-up finger spoiler, such that the aircraft control surface system comprises a plurality of the pop-up finger spoilers, wherein the plurality of pop-up finger spoilers are distributed along the aircraft structure, such that a space between each pop-up finger spoiler is greater than the width of one of the plurality of pop-up finger spoilers.

9. An aircraft including the aircraft structure of claim 8.

10. An aircraft control surface system for an aircraft structure, the system comprising:
a plurality of finger spoilers that are distributed along the aircraft structure, each finger spoiler of the plurality of finger spoilers having that has a length and a width, wherein the width is transverse to the length and the length is greater than the width; and
a deployment mechanism for moving the finger spoiler between:
a retracted position, in which at least a portion of the finger spoiler is curled to facilitate stowage within the aircraft structure; and
a deployed position, in which the at least a portion of the finger spoiler is uncurled, so that the finger spoiler acts as a control surface which extends from a surface of the aircraft structure;
wherein the width of a first finger spoiler of the plurality of finger spoilers is equal to or less than a distance between the first finger spoiler and a finger spoiler of the plurality of finger spoilers that is adjacent to the first finger spoiler; and
wherein the deployment mechanism is configured for being driven by a single source of driving force for moving two or more of the plurality of finger spoilers.

11. A method of moving a finger spoiler between a retracted position and a deployed position via an opening in an aircraft structure, wherein the finger spoiler has a length and a width, the width being transverse to the length, the method comprising:

moving the finger spoiler into the deployed position by extending the finger spoiler from the opening, such that a distal end of the finger spoiler is presented to airflow local to the aircraft structure;

moving the finger spoiler into the retracted position, in which the finger spoiler is curled, so as to allow the finger spoiler to be contained within an internal volume of the aircraft structure;

connecting the finger spoiler to a rotatable shaft;

to move the finger spoiler from the deployed position to the retracted position, rotating the shaft to curl the finger spoiler around the shaft, within the internal volume of the aircraft structure; and providing at least one further finger spoiler connected to the shaft and configured to curl around the shaft when moving into the retracted position, thereby defining a plurality of finger spoilers connected to the shaft;

wherein rotating the shaft moves at least one finger spoiler of the plurality of finger spoilers to the deployed position at a different time to another finger spoiler of the plurality of finger spoilers;

wherein, when the finger spoiler is in the deployed position, the finger spoiler is at least partially uncurled and there is a first distance measured along a straight portion of the finger spoiler, from the distal end of the finger spoiler to an opposite end of the straight portion, along the length of the finger spoiler; and wherein the internal volume has a maximum depth dimension that is less than the first distance.

12. The method of claim 11, wherein, when the finger spoiler is in the deployed position, a cross section of the finger spoiler is curved and presents a concave surface to the airflow local to the aircraft structure, such that the finger spoiler is rigid.

13. An aircraft control surface system for an aircraft structure, the system comprising:

a deployable control surface member; and a deployment mechanism for moving the deployable control surface member between:

a retracted position, in which at least a portion of the deployable control surface member is curled to facilitate stowage within the aircraft structure; and a deployed position, in which the at least a portion of the deployable control surface member is uncurled, so that the deployable control surface member acts as a control surface which extends from a surface of the aircraft structure;

wherein a cross section of the deployable control surface member is curved when the deployable control surface member is in the deployed position, such that a curvature of the cross section comprises a concave surface that is presented to airflow when in use;

wherein the curvature of the cross section has a minimum radius of curvature;

wherein the deployment mechanism has a curl radius; and wherein the curl radius is greater than the minimum radius of curvature.

14. The aircraft control surface system of claim 13, wherein the deployable control surface member is a finger spoiler that has a length and a width, wherein the width is transverse to the length and the length is greater than the width.

15. The aircraft control surface system of claim 14, wherein:

the finger spoiler has a thickness; and the minimum radius of curvature is greater than the thickness by a factor between 7 and 13.

16. An aircraft control surface system for an aircraft structure, the system comprising:

a plurality of deployable control surface members configured to be distributed along the aircraft structure; and a single source of driving force configured to drive a deployment mechanism for moving each of two or more of the deployable control surface members between:

a retracted position, in which at least a portion of each of the plurality of deployable control surface members is curled to facilitate stowage within the aircraft structure; and a deployed position, in which the at least a portion of each of the plurality of deployable control surface members is uncurled so that the deployable control surface member acts as a control surface which extends from a surface of the aircraft structure.

17. The aircraft control surface system of claim 16, wherein the deployable control surface members are finger spoilers, each finger spoiler has a length and a width, the width is transverse to the length, and the length is greater than the width.

* * * * *